United States Patent
Fletcher et al.

(10) Patent No.: US 10,024,339 B2
(45) Date of Patent: Jul. 17, 2018

(54) VACUUM CREATION SYSTEM HAVING AN EJECTOR, PNEUMATIC CONTROL VALVE AND OPTIONALLY AN ASPIRATOR

(71) Applicants: David E. Fletcher, Flint, MI (US); Brian M. Graichen, Leonard, MI (US); James H. Miller, Ortonville, MI (US); Rex Bravo, Framington, MI (US); Matthew C. Gilmer, Whitmore Lake, MI (US); Keith Hampton, Ann Arbor, MI (US); Andrew D. Niedert, New Hudson, MI (US)

(72) Inventors: David E. Fletcher, Flint, MI (US); Brian M. Graichen, Leonard, MI (US); James H. Miller, Ortonville, MI (US); Rex Bravo, Framington, MI (US); Matthew C. Gilmer, Whitmore Lake, MI (US); Keith Hampton, Ann Arbor, MI (US); Andrew D. Niedert, New Hudson, MI (US)

(73) Assignee: Dayco IP Holdings, LLC, Troy, MI (US)

(*) Notice: Subject to any disclaimer, the term of this patent is extended or adjusted under 35 U.S.C. 154(b) by 192 days.

(21) Appl. No.: 14/725,642

(22) Filed: May 29, 2015

(65) Prior Publication Data

US 2015/0345517 A1 Dec. 3, 2015

Related U.S. Application Data

(60) Provisional application No. 62/005,078, filed on May 30, 2014.

(51) Int. Cl.
*F04F 5/54* (2006.01)
*F04F 5/16* (2006.01)
(Continued)

(52) U.S. Cl.
CPC ............ *F04F 5/54* (2013.01); *F04F 5/16* (2013.01); *F04F 5/20* (2013.01); *F02B 2037/162* (2013.01)

(58) Field of Classification Search
CPC ........ F04F 5/14; F04F 5/24; F04F 5/16; F04F 5/20; F04F 5/467; F02B 2037/162; F04B 35/002; F04B 53/001; F04B 53/002
(Continued)

(56) References Cited

U.S. PATENT DOCUMENTS 1,845,969 A 2/1932 Hueber
2,037,884 A 4/1936 Day
(Continued)

FOREIGN PATENT DOCUMENTS

CN 2400655 10/2000
CN 1724298 A 1/2006
(Continued)

OTHER PUBLICATIONS

U.S., Advisory Action; U.S. Appl. No. 14/509,612; (dated Sep. 1, 2016).
(Continued)

*Primary Examiner* — Bryan Lettman
*Assistant Examiner* — Timothy Solak
(74) *Attorney, Agent, or Firm* — FisherBroyles, LLP; Susan M. Oiler

(57) ABSTRACT

Ejector assemblies and engine systems have a pressure regulator in fluid communication with an ejector. The pressure regulator receives boost pressure and selectively allows the boost pressure to pass through a valve opening therein under selected engine conditions and into the ejector as regulated boost pressure. Both the pressure regulator and the ejector each have a conduit defining a passageway that includes a Venturi gap separating the passageway into a (Continued)

converging section and a first diverging section that both narrow toward the Venturi gap. The pressure regulator has a piston operatively connected to a valve mechanism positioned for movement therewith to control the passage of the boost pressure through the valve opening, and the valve mechanism defines a passage therethrough that includes a gradually narrowing portion that is narrower than the valve opening.

15 Claims, 8 Drawing Sheets

(51) Int. Cl.
  *F04F 5/20* (2006.01)
  *F02B 37/16* (2006.01)
(58) Field of Classification Search
  USPC ..... 137/505.1, 505.18, 505.26, 502; 251/205
  See application file for complete search history.

(56) References Cited

U.S. PATENT DOCUMENTS

| | | | |
|---|---|---|---|
| 2,449,683 A | 9/1948 | Akerman et al. | |
| 2,512,479 A | 6/1950 | Callejo | |
| 2,626,009 A | 1/1953 | Sebok et al. | |
| 2,905,268 A | 9/1959 | McMichael | |
| 2,954,091 A | 9/1960 | McMichael | |
| 3,145,724 A | 8/1964 | Pelzer | |
| 3,234,932 A | 2/1966 | Bird et al. | |
| 3,430,437 A | 3/1969 | Saussele et al. | |
| 3,581,850 A | 6/1971 | Jaitl | |
| 3,614,859 A | 10/1971 | Clark | |
| 3,698,510 A | 10/1972 | Blatt et al. | |
| 3,754,841 A | 8/1973 | Grabb et al. | |
| 3,794,063 A * | 2/1974 | Carroll | F16K 3/26 137/505.18 |
| 3,826,281 A | 7/1974 | Clark | |
| 3,842,932 A | 10/1974 | Gibel | |
| 4,056,334 A * | 11/1977 | Fortune | B23K 1/018 228/20.5 |
| 4,211,200 A | 7/1980 | Rocchio et al. | |
| 4,354,492 A | 10/1982 | McPhee | |
| 4,424,883 A | 1/1984 | Musiani | |
| 4,499,034 A | 2/1985 | McAllister | |
| 4,554,786 A | 11/1985 | Takeuchi et al. | |
| 4,893,654 A | 1/1990 | Feuz | |
| 4,938,309 A | 7/1990 | Emdy | |
| 4,951,708 A | 8/1990 | Miller | |
| 5,108,266 A | 4/1992 | Hewitt | |
| 5,188,141 A | 2/1993 | Cook et al. | |
| 5,291,916 A | 3/1994 | Kloosterman et al. | |
| 5,326,942 A | 7/1994 | Schmid | |
| 5,368,276 A * | 11/1994 | Pfeiffer | B01J 8/082 137/240 |
| 5,783,780 A | 7/1998 | Watanabe et al. | |
| 6,035,881 A | 3/2000 | Emmerich et al. | |
| RE37,090 E | 3/2001 | Kloosterman et al. | |
| 6,220,271 B1 | 4/2001 | Emmerich et al. | |
| 6,308,731 B1 | 10/2001 | Kawasaki | |
| 7,029,103 B2 | 4/2006 | Iida | |
| 7,353,812 B1 | 4/2008 | Gosdzinski et al. | |
| 7,610,140 B2 | 10/2009 | Hirooka | |
| 7,628,170 B2 * | 12/2009 | Kok-Hiong | F16K 3/08 137/601.14 |
| 7,722,132 B2 | 5/2010 | Carlsson | |
| 8,517,056 B2 | 8/2013 | Cullin | |
| 2002/0002997 A1 | 1/2002 | Steinruck | |
| 2002/0027041 A1 | 3/2002 | Czabala et al. | |
| 2005/0045417 A1 | 3/2005 | Ni | |
| 2005/0045419 A1 | 3/2005 | Choi et al. | |
| 2005/0056318 A1 * | 3/2005 | Arlinghaus, Jr. | G05D 16/0655 137/505.13 |
| 2005/0121084 A1 | 6/2005 | Andersson | |
| 2006/0016477 A1 | 1/2006 | Zaparackas | |
| 2007/0044848 A1 | 3/2007 | Norman | |
| 2007/0170389 A1 * | 7/2007 | Koizumi | F16K 1/54 251/205 |
| 2007/0292816 A1 | 12/2007 | Miller | |
| 2008/0145238 A1 | 6/2008 | Shibayama et al. | |
| 2010/0199958 A1 | 8/2010 | Heckel et al. | |
| 2010/0300413 A1 * | 12/2010 | Ulrey | F02D 9/12 123/518 |
| 2011/0132311 A1 | 6/2011 | Pursifull et al. | |
| 2011/0186151 A1 | 8/2011 | Sparazynski | |
| 2012/0024249 A1 | 2/2012 | Fuhrmann et al. | |
| 2013/0139911 A1 | 6/2013 | Wilson et al. | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2014/0014080 A1 | 1/2014 | Beshay et al. | |
| 2014/0165962 A1 | 6/2014 | Pursifull | |
| 2014/0360607 A1 | 12/2014 | Fletcher et al. | |

FOREIGN PATENT DOCUMENTS

| | | |
|---|---|---|
| CN | 201377408 Y | 1/2010 |
| CN | 201907500 | 7/2011 |
| DE | 3809837 A1 | 10/1988 |
| DE | 4310761 | 10/1994 |
| DE | 102006016937 A1 | 10/2007 |
| EP | 3442582 A1 | 8/1991 |
| EP | 1602820 A2 | 12/2005 |
| GB | 2110344 | 6/1983 |
| GB | 2129516 | 5/1984 |
| JP | 07-117010 | 12/1995 |
| JP | 2009168134 | 7/2009 |
| WO | 2001/086152 | 11/2001 |
| WO | 2007/050011 A1 | 5/2007 |
| WO | 2008/014306 A2 | 1/2008 |
| WO | 2010054900 A1 | 5/2010 |

OTHER PUBLICATIONS

U.S., Notice of Allowance; U.S. Appl. No. 14/509,612; (dated Oct. 17, 2016).
U.S., Final Office Action; U.S. Appl. No. 14/565,075; (dated Apr. 1, 2016).
U.S., Notice of Allowance; U.S. Appl. No. 14/565,075; (dated Nov. 28, 2016).
PCT, International Search Report and Written Opinion, PCT/US2014/041250 (dated Oct. 27, 2014).
PCT, International Search Report and Written Opinion, PCT/US2014/059672 (dated Jan. 9, 2015).
PCT, International Search Report and Written Opinion, PCT/US2014/069279 (dated Feb. 26, 2015).
PCT, International Search Report and Written Opinion, PCT/US2015/012018 (dated May 8, 2015).
CN, Search Report with English translation; Chinese Patent Application No. 201480001422.9; (dated Jul. 20, 2016).
CN, Office Action with English translation; Chinese Patent Application No. 201480001422.9; (dated Aug. 1, 2016).
U.S., Final Office Action; U.S. Appl. No. 14/600,598; (dated Aug. 19, 2016).
U.S., Final Office Action; U.S. Appl. No. 14/509,612; (dated Jun. 22, 2016).
U.S., Non-Final Office Action; U.S. Appl. No. 14/565,075; (dated Jul. 21, 2016).
U.S., Non-Final Office Action; U.S. Appl. No. 14/565,075 (dated Nov. 16, 2015).
English translation of JP 07-117010, accessed Nov. 9, 2015, <https://www4.j-platpat.inpit.go.jp/cgi-bin/tran_web_cgi_ejje?u=http://www4.j-platpat.inpit.go.jp/eng/translation/20151110030429332207917469240101009​32AF2D1BD4629B19B03A22964BC2FC8>.
CN, Office Action with English translation; Chinese Patent Application No. 201480001422.9; 19 pages. (dated Feb. 16, 2017).

(56) References Cited

OTHER PUBLICATIONS

PCT, International Search Report and Written Opinion; Application No. PCT/US2015/033079 (dated Aug. 21, 2015).
EP, Extended European Search Report; Patent Application No. 14852220.4, Applicant Jayco IP Holdings, LLC, 6 pages. (dated May 10, 2017).
CN, Office Action with English translation; Chinese Patent Application No. 2015800050465, Applicant Dayco Ip Holdings, LLC, 7 pages. (dated Jul. 4, 2017).
CN, Search Report with English translation; Chinese Patent Application No. 2015800050465, Applicant Dayco IP Holdings, LLC, 4 pages. (dated Jul. 4, 2017).
U.S., Non-Final Office Action, U.S. Appl. No. 14/509,612; (dated Dec. 18, 2015).
CN, Office Action with English Translation; Chinese Application No. 2014800021792 (dated Aug. 28, 2017).
EP, European Supplementary Search Report; Application No. 15737914.0 (dated Jul. 7, 2017).
EP, European Supplementary Search Report; Application No. 14869909.3 (dated Jun. 30, 2017).

* cited by examiner

POSITION B

VACUUM CREATION SYSTEM HAVING AN EJECTOR, PNEUMATIC CONTROL VALVE AND OPTIONALLY AN ASPIRATOR

RELATED APPLICATIONS

This application claims the benefit of U.S. Provisional Application No. 62/005,078, filed May 30, 2014.

TECHNICAL FIELD

This application relates to vacuum creation by an ejector assembly and, more particularly, to an ejector assembly connected to a high pressure source (a pressure higher than atmospheric pressure) as its motive source.

BACKGROUND

In some vehicles, vacuum is used to operate or assist in the operation of various devices. For example, vacuum may be used to assist a driver applying vehicle brakes, to operate actuators for turbochargers, heating and ventilation systems, a drive line, and to purge fuel vapors, to name a few. If the vehicle does not produce sufficient vacuum naturally, such as from the intake manifold, then a separate vacuum source is required to operate such devices. An aspirator or an ejector can produce vacuum when supplied with manifold vacuum or boosted air from a turbo- or super-charger, respectively. The depth of vacuum produced will be a function of the motive pressure. An ejector, as used herein, is a converging, diverging nozzle assembly connected to a pressure source above atmospheric pressure. By passing pressurized air through the ejector, a low pressure region may be created within the ejector so that air can be drawn from a vacuum reservoir or may directly act on a device requiring vacuum, thereby reducing pressure within the vacuum reservoir or device requiring vacuum.

Typical ejectors cannot produce a suction pressure below atmospheric pressure when the motive pressure exceeds 192 kPa absolute and have no control over the motive flow rate. Boosted engines routinely have fluctuations in the boosted pressure, for example the flow coming from a compressor of a turbo- or super-charger. Thus, there is a need to improve the performance of an ejector on such a vehicle, in particular to regulate the flow of the boosted pressure for better control thereof, including providing a generally constant flow rate of boost pressure into the ejector and/or to provide greater depth of vacuum.

SUMMARY

In one aspect, ejector assemblies are disclosed herein that provide improved control of boost pressure to generate vacuum needed for sub-systems within an engine system. In particular, the systems herein provide a constant flow through the ejector using a pressure regulator, even as boost pressure varies, to generate usable vacuum over a broader range of boost pressure. The ejector assemblies include the pressure regulator in fluid communication with an ejector, where the pressure regulator receives boost pressure and selectively allows the boost pressure to pass through a valve opening therein under selected engine conditions and into the ejector as regulated boost pressure.

In a first embodiment, both the pressure regulator and the ejector each have a conduit defining a passageway that includes a Venturi gap separating the passageway into a converging section and a diverging section that both narrow toward the Venturi gap. In another aspect of the first embodiment, the pressure regulator has a container portion defining an internal chamber, a port in fluid communication with the internal chamber, and a piston operatively connected to a valve mechanism positioned for movement therewith to control the passage of boost pressure through the valve opening. The port is in fluid communication with a source at a pressure less than the boosted pressure. In one embodiment, the pressure regulator may include a spring biasing the piston into a maximum open position.

In one embodiment, the valve mechanism of the pressure regulator includes a passage therethrough having a first portion that is wider than a second portion, and the valve opening into the diverging section is a horizontally oriented generally rectangularly-shaped opening.

In another embodiment, the valve mechanism of the pressure regulator includes a passage therethrough having a generally triangularly-shaped portion that is dimensionally smaller than the valve opening.

In another aspect of any of the embodiment herein, the ejector assembly also includes a noise attenuating unit positioned downstream of the Venturi gap of the ejector. The noise attenuating unit houses a porous sound attenuating member through which the regulated boost pressure flows.

In another aspect of the first embodiment, the ejector includes a suction port in fluid communication with a device requiring vacuum.

In another aspect of the first embodiment, the ejector assembly may include an aspirator in fluid communication between the suction port of the ejector and the device requiring vacuum. The aspirator has a conduit defining a passageway that includes a Venturi gap separating the passageway thereof into a converging section and a diverging section that both narrow toward the Venturi gap.

In a second embodiment, an ejector assembly having a pressure regulator in fluid communication with an ejector, has the pressure regulator receiving boost pressure and selectively allowing the boost pressure to pass through a valve opening therein under selected engine conditions and into the ejector as regulated boost pressure. The ejector has a first conduit defining a passageway that includes a Venturi gap separating the passageway into a converging section and a diverging section that both narrow toward the Venturi gap. The pressure regulator has a piston operatively connected to a valve mechanism positioned for movement therewith to control the passage of the boost pressure through the valve opening, and the valve mechanism comprises a passage therethrough that includes a gradually narrowing portion that is narrower than the valve opening.

In one aspect of the second embodiment, the pressure regulator includes a second conduit defining a pocket in which the valve mechanism is seated. The pocket defines a second Venturi gap. The pressure regulator also includes a container portion defining an internal chamber and a port in fluid communication with the internal chamber. The port is in fluid communication with a source at a pressure less than the boosted pressure.

In another aspect of the second embodiment, the ejector assembly may include an aspirator in fluid communication between the suction port of the ejector and the device requiring vacuum.

In a third embodiment, engine systems are disclosed that include a turbocharger having a compressor, any one of the ejector systems disclosed herein, which are in fluid communication with the compressor, and a device requiring vacuum in fluid communication with the ejector. Here, the boost pressure from the compressor is in fluid communication with the first converging section of the pressure regulator. The pressure regulator has a container portion defining an internal chamber, a port in fluid communication with the internal chamber, and a piston operatively connected to a valve mechanism positioned for movement therewith to control the passage of boost pressure through the valve opening. In one embodiment, the port is in fluid communication with a source at a pressure less than the boosted pressure, and the valve mechanism comprises a passage therethrough that includes a gradually narrowing portion that is narrower than the valve opening.

DETAILED DESCRIPTION

Figure 1:
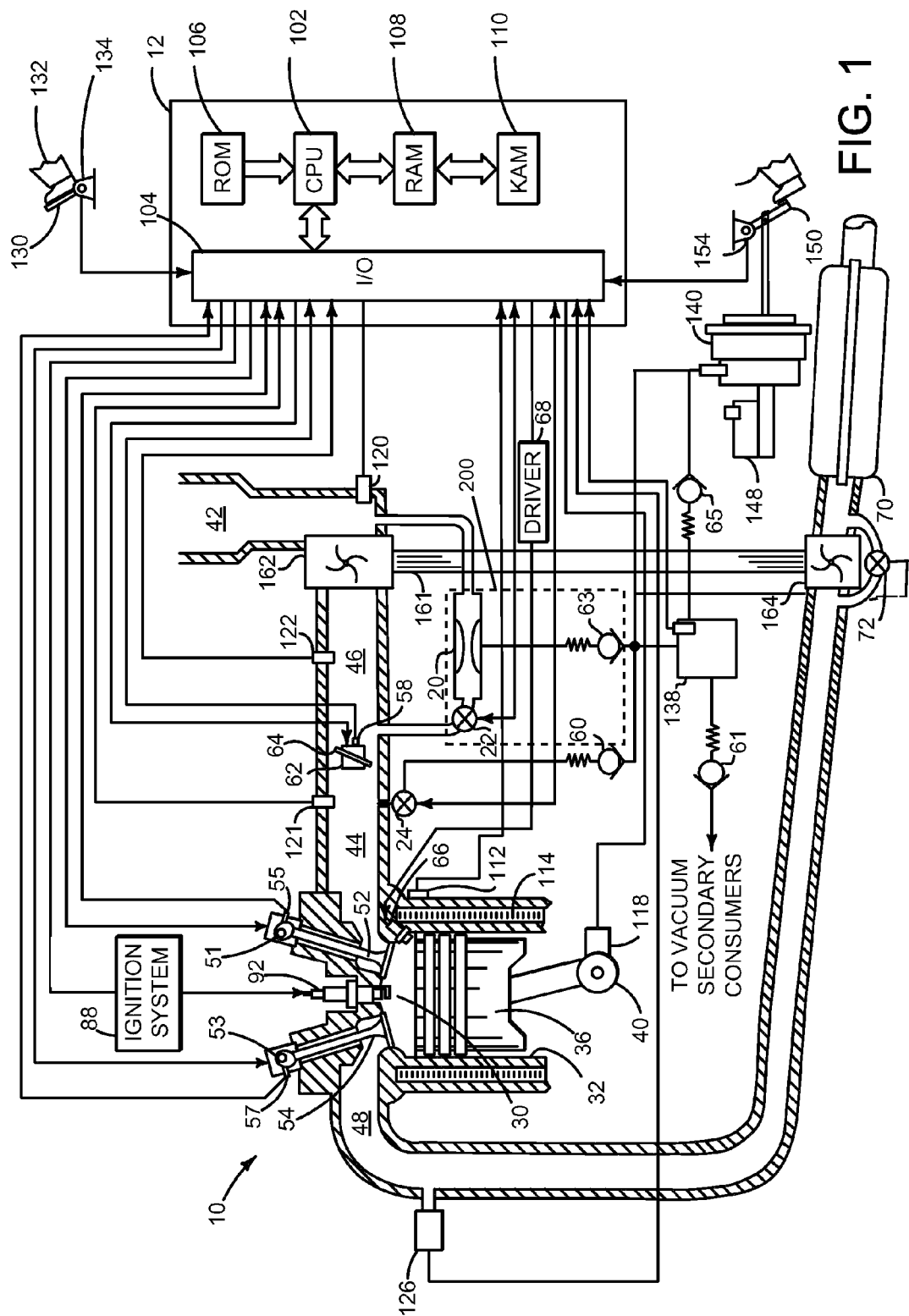
FIG. 1 is a schematic representation of an engine having an ejector assembly as disclosed herein.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIG. 1 shows one example embodiment for providing vacuum to a vehicle vacuum system improved by having the ejector assembly disclosed herein and described with reference to FIGS. 2-6 or the ejector-aspirator assembly disclosed herein and described with reference to FIGS. 7-8. Referring now to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Vacuum is supplied to waste gate actuator 72 via vacuum reservoir 138 or directly from the ejector assembly 200. Vacuum reservoir 138 may be supplied vacuum from intake manifold 44 via intake manifold vacuum flow control valve 24 and check valve 60. Intake manifold vacuum flow control valve 24 is operated via an electrical signal from controller 12. In some examples, check valve 60 may be omitted. Vacuum reservoir 138 may also be supplied vacuum via ejector 20 of the ejector assembly 200. Pressure regulator 22 is controllable to be selectively opened to permit compressed air, at pressures higher than atmospheric pressure (boost pressure), from compressor 162 of a turbocharger to pass through ejector 20. Compressed air passes through ejector 20 and creates a low pressure region within ejector 20, thereby providing a vacuum source for vacuum reservoir 138 or directly to a device requiring vacuum 202 (FIG. 2) such as the wastegate valve 72.

As seen in FIG. 1, the air flowing through ejector 20 is returned to the intake system at a location upstream of compressor 162, but may be discharged to any portion of the system that is at conditions the same or generally similar to atmospheric or a pressure lower than boost pressure(s). In an alternative example, air flowing through the ejector 20 may be returned to the air intake system via conduits to the intake manifold at a location downstream of throttle 62 and at a location upstream of compressor 162. In the alternative configuration, valves may be placed between the outlet of ejector 20 and intake manifold 44 as well as between the outlet of ejector 20 and air intake 42.

Figure 3:
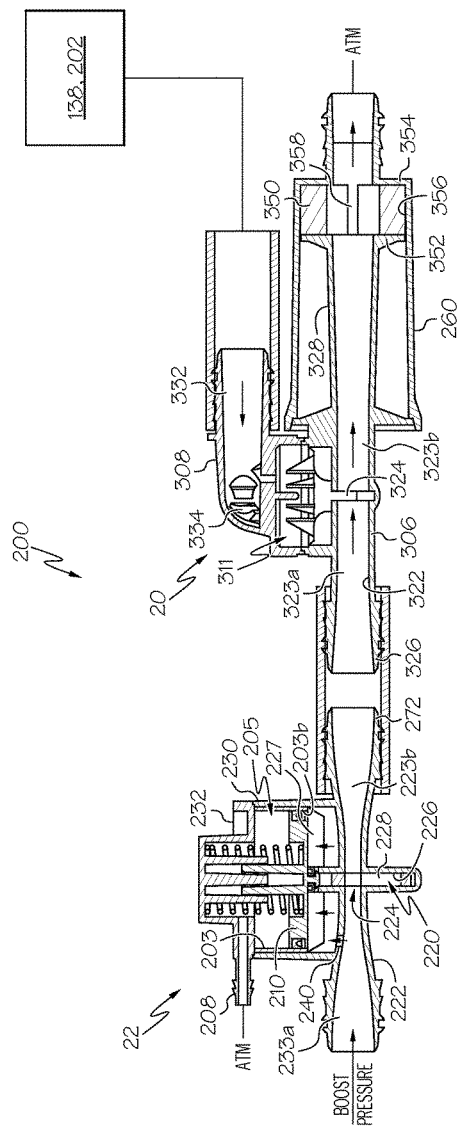
FIG. 3 is a longitudinal cross-sectional view of the ejector assembly of FIG. 2.

In FIG. 1, check valve 63 ensures air does not pass from ejector 20 to the vacuum reservoir 138 or to the device requiring vacuum 202, e.g., wastegate valve 72 or brake booster 140. As seen in FIG. 3, the check valve 63 may be incorporated into the ejector 20. Vacuum reservoir 138 provides vacuum to brake booster 140 via check valve 65. Vacuum reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Alternately, the ejector assembly 200 may directly supply vacuum to any of these vacuum consumers. Check valve 61 limits air flow from vacuum reservoir 138 to secondary vacuum consumers (e.g., vacuum consumers other than the vehicle braking system). Brake booster 140 may include an internal vacuum reservoir, and it may amplify force provided by the brake pedal 150 to master cylinder 148 for applying vehicle brakes (not shown).

An ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

The engine depicted in FIG. 1 is not intended to be limiting and may be included in an electric motor/battery system in a hybrid vehicle or in a diesel engine.

Figure 2:
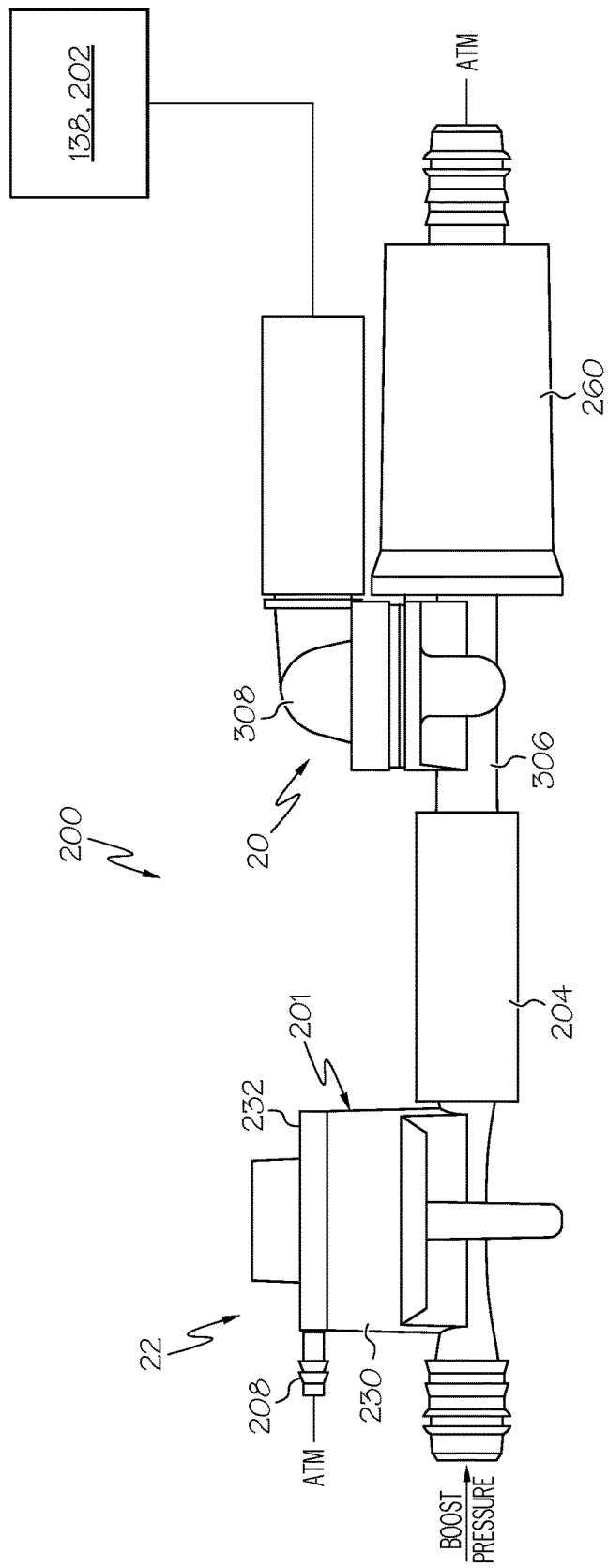
FIG. 2 is a side plan view of an embodiment of the ejector assembly.

Referring now to FIG. 2, ejector assembly 200 is shown in an enlarged view. The ejector assembly 200 includes a pressure regulator 22 connected to receive boost pressure and connected to an ejector 20 by a conduit 204 providing fluid communication therebetween, in particular to allow the boost pressure to flow through the pressure regulator under selected engine conditions and into and through the ejector. The pressure regulator 22 includes a housing 201 that may include a container portion 230 and a cap 232 defining an internal chamber 203 (FIG. 3) and having a port 208 in fluid communication with the chamber 203. The port 208 enters the housing 201 through the cap 232, but could enter through the container portion 230, and is in fluid communication with the atmosphere. The port 208 may allow air to flow into the chamber 203 or to act as a vent for air to exit the chamber 203. Preferably, the cap 232 is sealingly connected to the container portion 230.

Referring to FIGS. 3-6, housing 201 and its internal components, collectively are an actuator 205 for a valve mechanism 220. Within chamber 203 there is a piston 210 having a stem 214 that is connected to the valve mechanism 220. The stem 214 has a proximal end 252 (which may be referred to herein as the coupling end) proximate to the valve mechanism 220 and a distal end 254 removed from the valve mechanism 220 (labeled in FIG. 4). The valve mechanism 220, in this embodiment, includes a conduit 222 having a valve opening 224 and a pocket 226 and includes a gate member 228 at least partially receivable in the pocket 226 and having a passage 229 therethrough. As best seen in FIG. 3, the pocket 226 separates the conduit 222 into a converging section 223a and a diverging section 223b that meet at the pocket to define the valve opening 224. Both the converging section 223a and the diverging section 223b define continuously, gradually tapering inner passageways that narrow as they approach the valve opening 224, thereby having the smallest inner dimension at the valve opening 224 and creating a Venturi effect on the boost pressure as it passes through the pressure regulator 22. As shown in FIG. 3, the converging section 223a has an opening 240 leading therefrom into the lower portion 203b of the chamber 203 below the piston 210 so that boost pressure can act upon the piston face 227 opposite the face upon which the spring 212 is seated.

Figure 4:
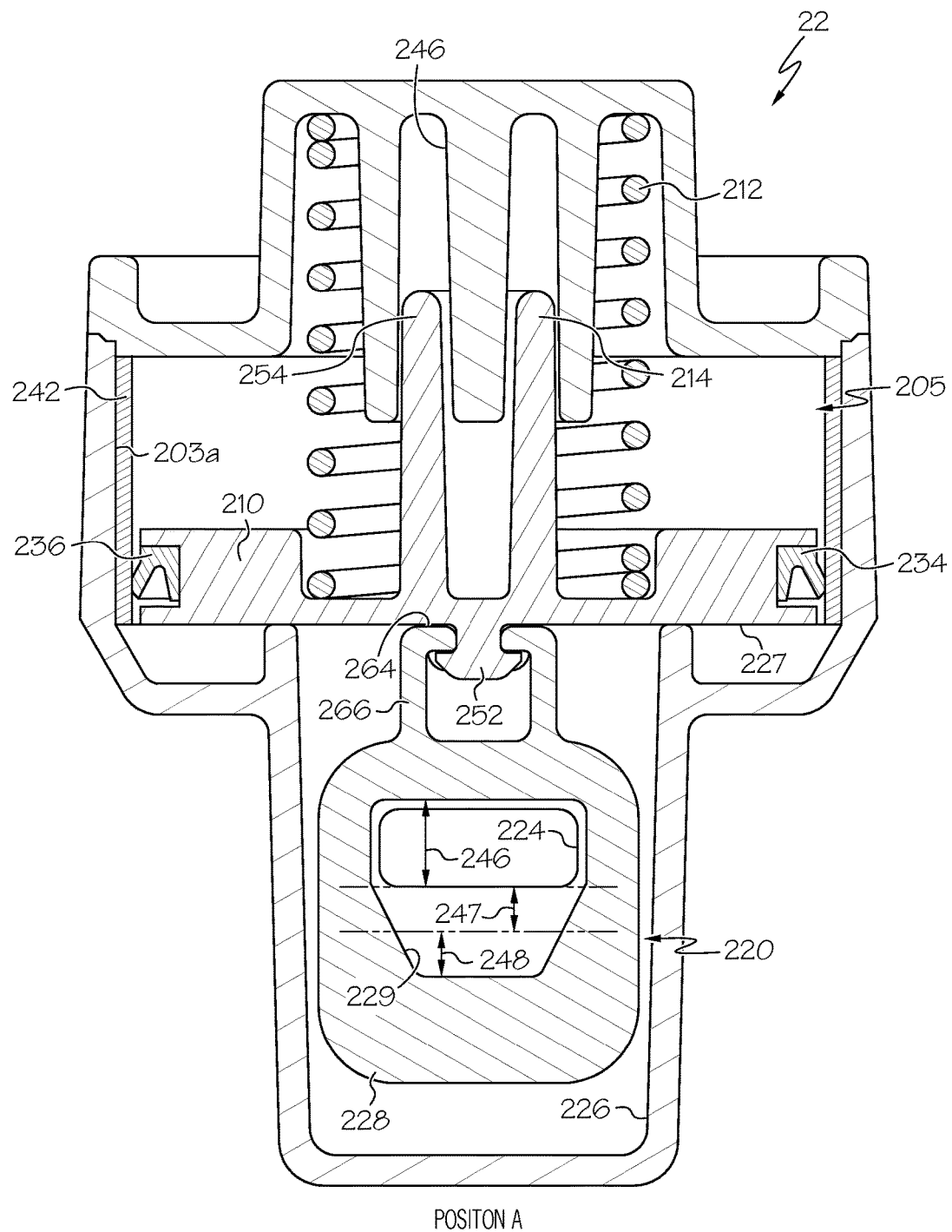
FIG. 4 is a cross-section of the pressure regulator taken through the gate member and pocket, perpendicular to the longitudinal cross-sectional view of FIG. 3, in a maximum open position A.
Figure 5:
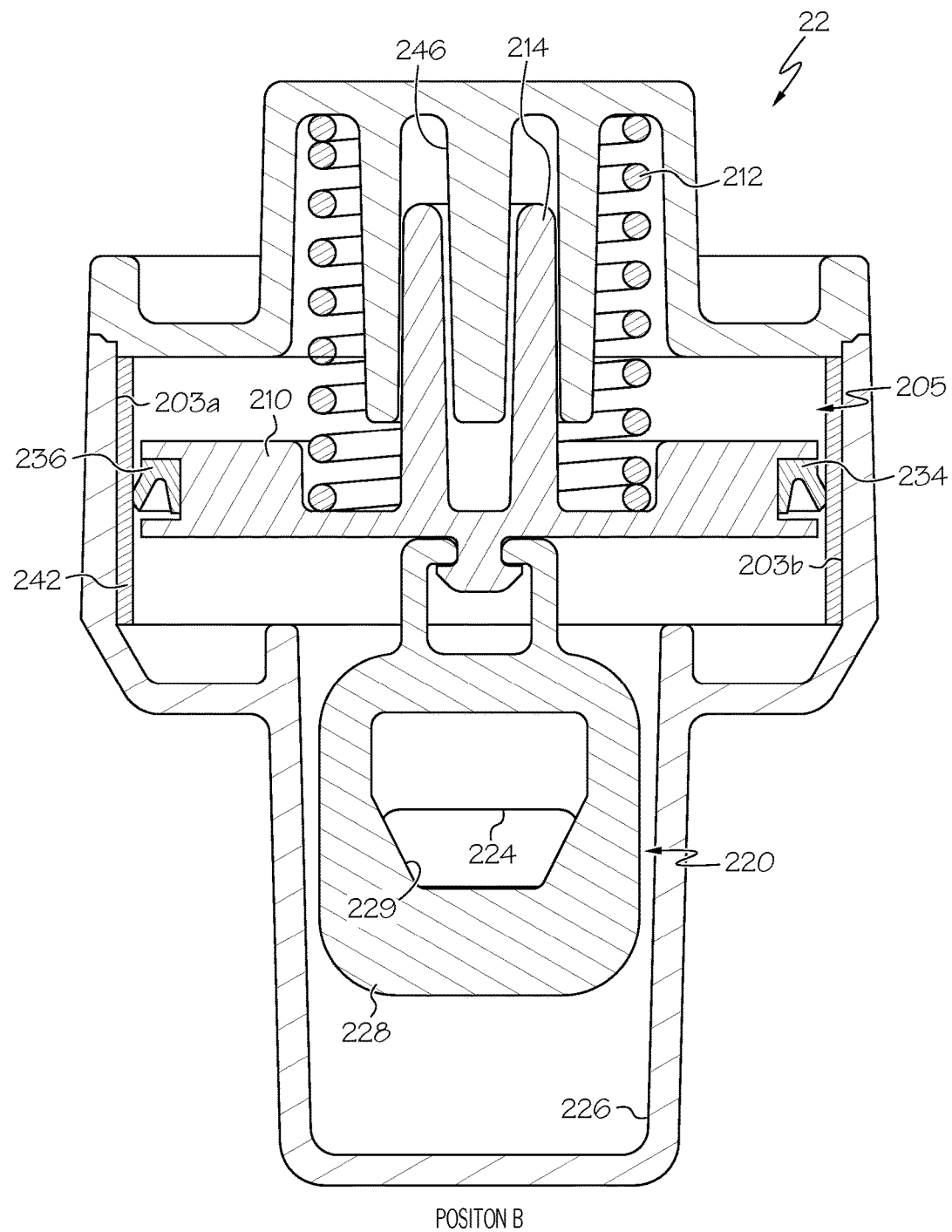
FIG. 5 is a cross-section of the pressure regulator taken through the gate member and pocket, perpendicular to the longitudinal cross-sectional view of FIG. 3, in an intermediate open position B.
Figure 6:
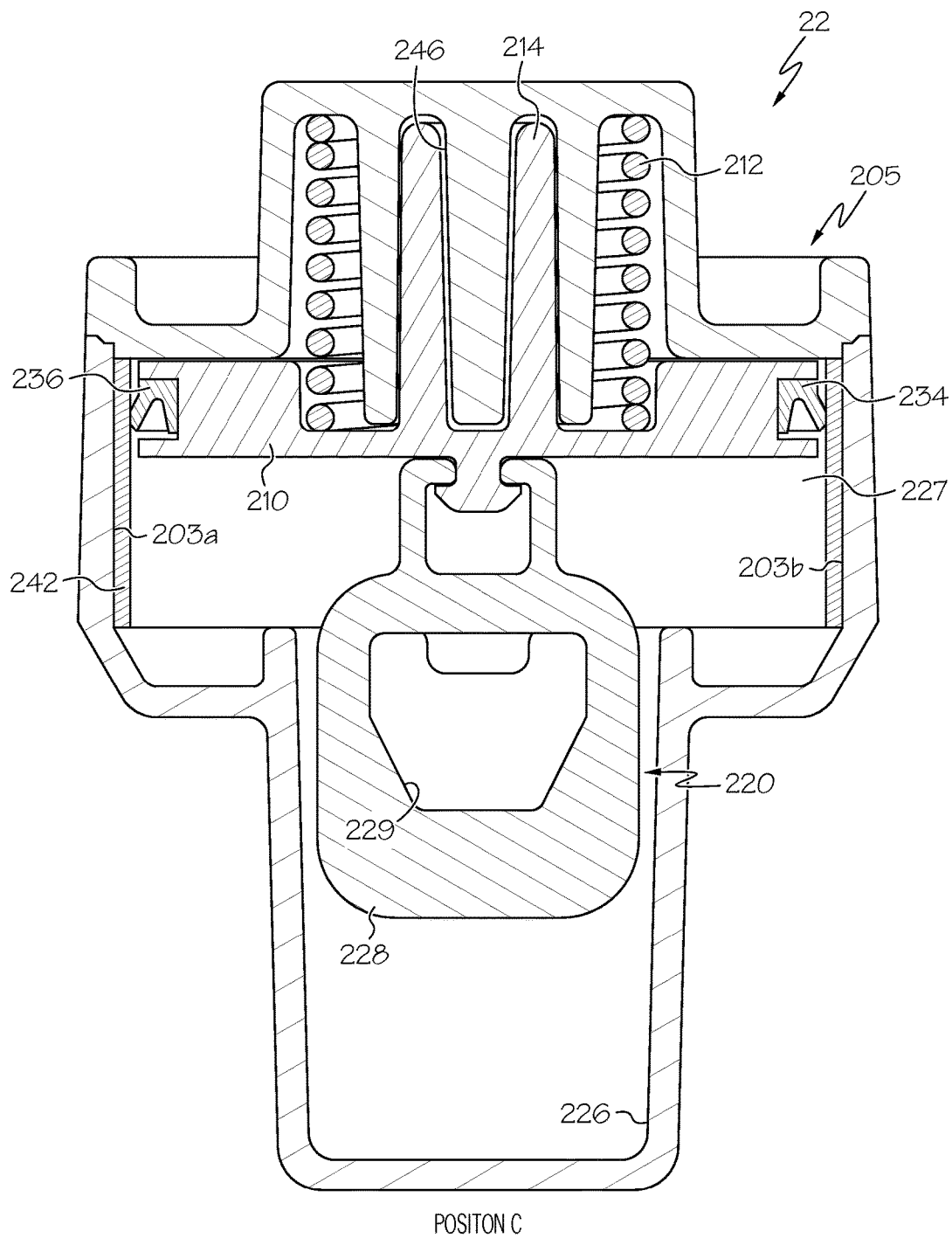
FIG. 6 is a cross-section of the pressure regulator taken through gate member and pocket perpendicular to the longitudinal cross-sectional view of FIG. 3, in a minimum open position C.

As seen in FIGS. 4-6, the gate member 228 is connected to the piston 210 so that the actuator 205 controls the movement of the gate member 228 between various positions. The piston 210 is urged by a normal force applied thereto by a spring 212, which has one end seated against the piston 210 and the other end seated against the cap 232, to a maximum open position (Position A) shown in FIG. 4, when the normal force is greater than the force applied to the piston face 227 by the boost pressure. The piston 210 is urged upward, as seen in FIGS. 5 and 6, when the normal force applied by spring 212 is overcome by boost pressure acting on the piston face 227. FIG. 6 depicts a closed position C relative to the valve opening 224, which may also be the maximum distance of travel allowed for the piston 210 by the housing 201 or a feature therein. FIG. 5 depicts an intermediate open position B, where the boost pressure is large enough to move the piston 210 a distance of its travel that is less than the maximum distance of travel shown in FIG. 6. FIG. 5 is merely one embodiment of an intermediate position. A plurality of intermediate positions between the maximum open position A and a minimum open position (not shown) are possible and will be responsive to variations in the boost pressure, which may be tailored by the choice of spring 212.

The valve mechanism 220 may be connected to the piston 210 by a rail system providing sliding movement of the gate member 228 along the central longitudinal axis of the conduit 222. The rail system (still referring to FIGS. 4-6) includes raceway grooves 264 near the proximal end 252 of stem 214 on opposing sides thereof. The gate member 228 includes a slider 266 shaped and configured to slide into the raceway grooves 264. The distal end 254 of the stem 214 of the piston 210 may extend away from the piston opposite the valve mechanism, and, as seen in FIGS. 4-6, be received in a guide channel 246 within the cap 232 that provides alignment to the actuator 205 and prevents twisting and/or buckling of the spring 212 and/or piston 210.

Still referring to FIGS. 4-6, the piston 210 may also include a sealing member 234 about its outer periphery as a lip seal against the interior surface of chamber 203. The outer periphery of the piston 210 may include an annular groove 236 in which to seat the sealing member 234. In one embodiment, the sealing member 234 may be an O-ring, a V-ring, or an X-ring. Alternately, the sealing member 234 may be any other annular seal made of sealing material for sealing engagement against another member. The inner surface of chamber 203 that the sealing member 234 contacts as the piston is moved through its range of travel may be lined with a material 242, which may be a coating or an annual ring of material, that reduces wear (friction) of the sealing member and may also enhance the seal separating the chamber 203 into its upper portion 203a and its lower portion 203b.

As shown in FIGS. 4-6, the valve opening 224 is a generally rectangularly-shaped opening oriented with the longer sides thereof oriented horizontally as upper and lower sides. Further, to facilitate the maximum open, intermediate open, and closed positions A-C, the gate member 228 includes a passage 229 that has an upper portion 246 that is wider than the lower portion 248 and an intermediate portion 247 that gradually, continuously tapers from the wider upper portion 246 to the narrower lower portion 248. The upper portion 246 may by generally rectangular-shaped to match the valve opening 224. The lower portion 248 may be generally triangular-shaped that is dimensionally smaller than the valve opening 224, thereby the gate member 228 closes a portion of the valve opening 224. As depicted in FIGS. 4-6, the passageway 229 may be an irregular pentagon where the upper portion 246 is generally rectangular-shaped to generally dimensionally match the valve opening and the intermediate portion 247 and the lower portion 248 together define a generally triangular-shaped portion of the passageway 229.

Referring back to FIGS. 2-3, the ejector 20 includes a lower body portion 306 and an upper body portion 308 that when assembled together may define a check valve 311 therebetween. The check valve may be constructed or have similar features to those described in co-pending patent application Ser. No. 14/600,598, filed Jan. 20, 2015 and/or Ser. No. 14/509,612, filed Oct. 8, 2014, which are each incorporated herein by reference in its entirety. The lower body portion 306 defines a conduit 322 that includes a Venturi gap 324 separating the conduit 322 into a converging section 323a and a diverging section 323b that both define continuously, gradually tapering inner passageways that narrow as they approach the Venturi gap 324 and creating a Venturi effect on the regulated boost pressure as it passes from the pressure regulator 22 and into the ejector 20. Accordingly, the motive port 326 of the converging section 323a is connected to the discharge port 272 of the pressure regulator 22.

The discharge port 328 may include a noise attenuating unit 260. The noise attenuating unit 260 is generally similar to the unit described in co-pending patent application Ser. No. 14/565,075, filed Dec. 9, 2014, incorporated herein in its entirety. The noise attenuating unit 260 includes a porous sound attenuating member 350 downstream of the Venturi gap 324 and disposed for the boost pressure air to flow therethrough. To hold the porous sound attenuating member 350 in such a position, a discharge port 328 terminates in a first canister portion 352. A second canister portion 354 is mated to the first canister portion 352 to enclose the sound attenuating member 350 in an enclosed chamber 356 defined therebetween. The porous sound attenuating member 350 may be a disc of porous material having a generally central bore therethrough or a plurality of bore holes therethrough, and/or a partial bore to receive an alignment pin 358, a plurality. The porous sound attenuating member 350 may alternately be a continuous plug of porous material with the only passageways therethrough being channels defined by its natural porosity, i.e., no enlarged bore holes are present. The continuous plug may be any shape and configuration to fit within the selected portion of the ejector, but as illustrated may be disc-shaped. The porous character of the sound attenuating members cause the noise pressure waves to attenuate by interfering with themselves, but should be of sufficient size and shape to not unduly restrict fluid flow. The porous sound attenuating member can be made from a variety of materials including metals, plastics, ceramics, or glass. The sound attenuating members may be made from wire, woven or matted, sintered particles, fibers woven or matted, but are not limited thereto.

The upper body portion 308 defines a suction port 332 having one or more openings 334 therein in fluid communication with the check valve 311 and the Venturi gap 324 in the lower body portion 306. Accordingly, as regulated boost pressure flows through the Venturi gap 324, suction is created to draw a flow of fluid from the suction port 332 into the Venturi gap 324. The suction port 332 may be connected to a device requiring vacuum 202, which also includes a vacuum reservoir 138.

In operation, the valve mechanism 220 in the pressure regulator 22 utilizes the spring 212 to have the gate member 228 in the maximum open position A of FIG. 4 as its normal position. The piston 210 is seated in this normal position and remains in this position held there by the spring force until a threshold force is applied to the piston face 227 by the boost pressure. As the boost pressure begins to exceed the threshold force, the gate member 228 begins to move toward a closed position. When the boost pressure exceeds a predetermined value, the gate member may be moved to closed position C shown in FIG. 6. The ejector assembly 200 with the varying shape of passage 229 provides the advantage of varying the size of the flow through the valve opening as the boost pressure changes, which provides a constant flow through the ejector and generates a usable vacuum over a larger range of boost pressure.

Figure 7:
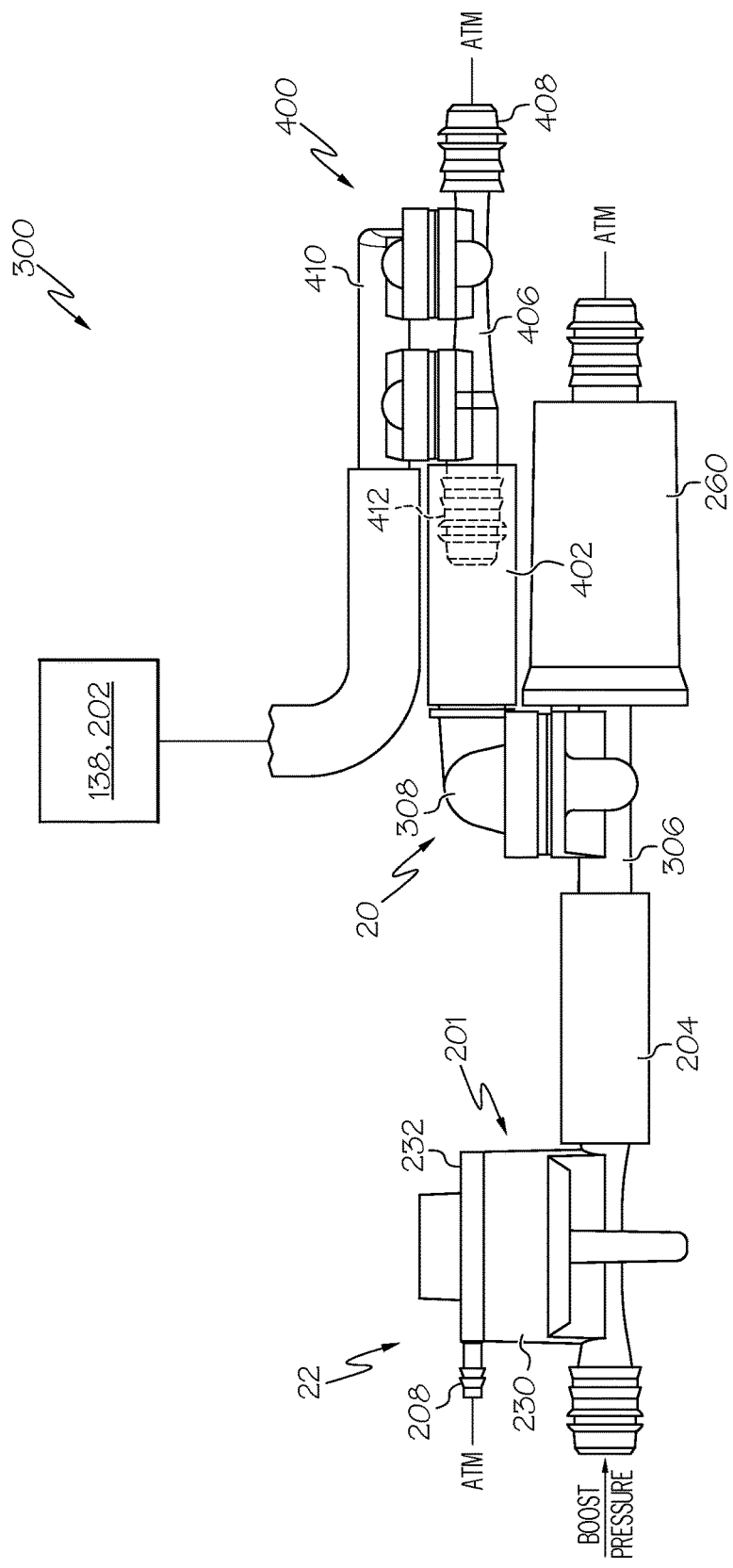
FIG. 7 is a side plan view of an embodiment of an ejector-aspirator assembly.
Figure 8:
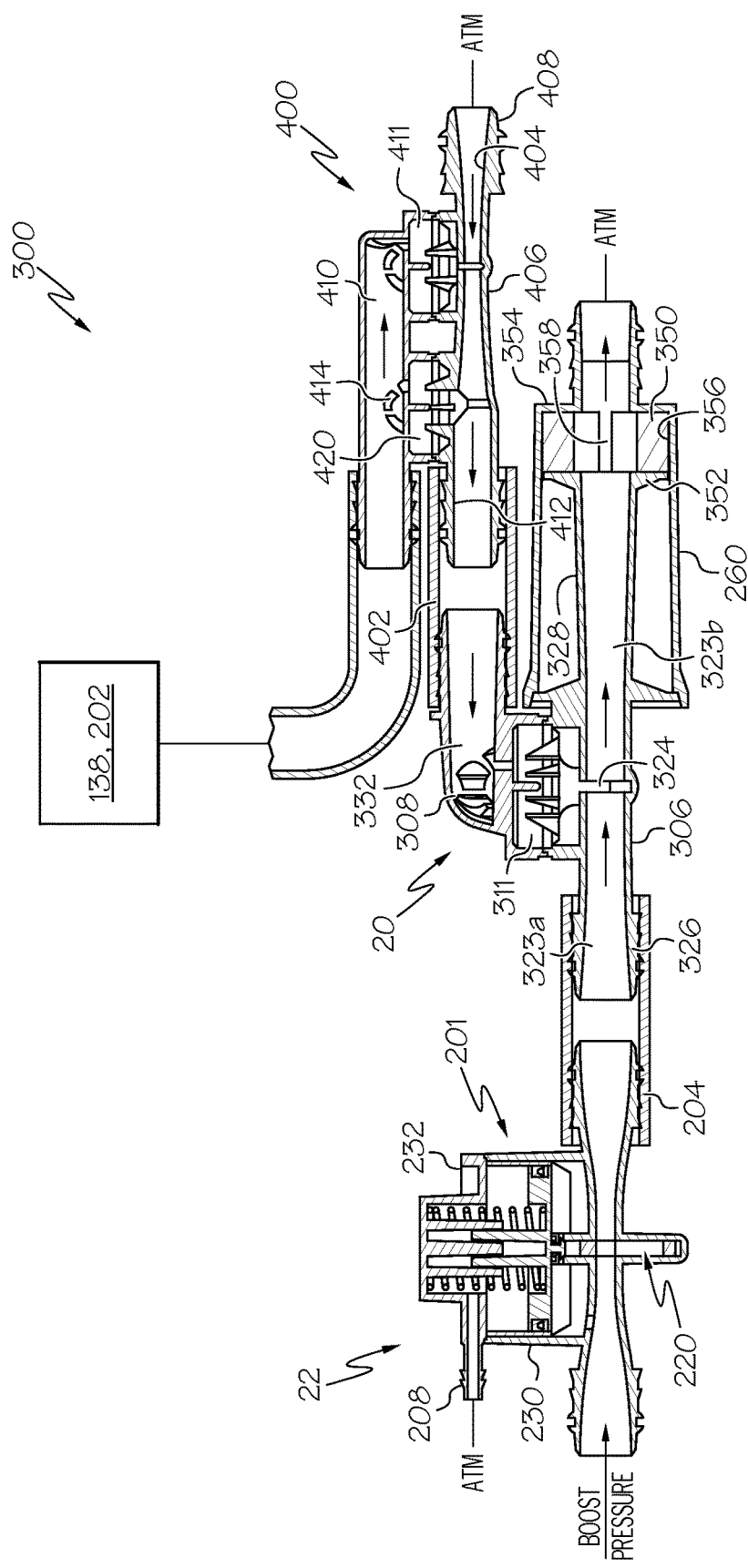
FIG. 8 is a longitudinal cross-sectional view of the ejector-aspirator assembly of FIG. 7.

Referring now to FIGS. 7-8, an ejector-aspirator assembly 300 is depicted that includes the ejector 20, the pressure regulator 22, and optionally the noise attenuating unit 260, as described above with respect to FIGS. 2-6, but additionally includes an aspirator 400 having its discharge port or aspirator outlet 412 in fluid communication with the suction port 332 of the ejector 20. A conduit 402 may connect the two together. The aspirator 400 is generally as described in co-pending patent application Ser. Nos. 14/600,598, 14/509, 612, and/or Ser. No. 14/565,075 referred to above.

Aspirator 400 includes a body 406 defining passageway 404 and having three or more ports that are connectable to an engine or components connected thereto. The ports include: (1) a motive port 408, which may be connected to a source at atmospheric pressure, typically clean air, e.g., from the engine intake air cleaner; (2) a suction port 410, which can connect via an optional check valve 411 to the device requiring vacuum 202 or a vacuum reservoir 138; (3) an aspirator outlet 412, which is connected to an engine intake manifold downstream of the throttle of the engine; and, optionally, (4) a bypass port 414. Each of the respective ports 408, 410, 412, and 414 may include a connector feature on the outer surface thereof for connecting the respective port to a hose or other component in the engine.

Check valve 411 is preferably arranged to prevent fluid from flowing from the suction port 410 to the device requiring vacuum 202. In one embodiment, the device requiring vacuum may be a wastegate valve. In another embodiment, the device requiring vacuum 202 is a hydraulic valve. The bypass port 414 may be connected to the device requiring vacuum 202 and, optionally, may include a check valve 420 arranged to control the flow of fluid to or from the bypass port 414 to the application device 202.

In operation, boost pressure from the turbocharger compressor enters the pressure regulator 22 and flows through the gate passageway 229 (at a Venturi gap in the pressure regulator) to and then through the Venturi gap 324 in the ejector 20 to draw air through the suction port 332 of the ejector and, because of its connection to the aspirator outlet 412, draws the motive flow through the aspirator 400, thereby drawing air through the suction port 410 of the aspirator. This system generates a deeper vacuum from the combined effect of the draw of fluid (typically air) through the suction ports 410 and 332 than the ejector assembly 200 of FIGS. 2-6 could produce alone, and is advantageous in systems where the ejector alone does not produce the depth of vacuum required for operation of a particular system or device.

The systems disclosed herein provide improved control of boost pressure to generate vacuum needed for sub-systems within an engine system. In particular, the systems herein provide a constant flow through the ejector even as boost pressure varies to generate usable vacuum over a broader range of boost pressure.

Having described the invention in detail and by reference to preferred embodiments thereof, it will be apparent that modifications and variations are possible without departing from the scope of the invention which is defined in the appended claims.

What is claimed is:

1. An ejector assembly comprising:
    a pressure regulator in fluid communication with an ejector, the pressure regulator receiving boost pressure and selectively allowing the boost pressure to pass through a valve opening therein under selected conditions and into the ejector as regulated boost pressure; wherein the pressure regulator comprises:
        a first conduit defining a first passageway that includes a first Venturi gap separating the first passageway into a first converging section and a first diverging section that both narrow toward the first Venturi gap; and
        a gate member of a valve mechanism received in the first Venturi gap and operatively movable to open and close the first Venturi gap, wherein the gate member has a through passage therein that has a first portion that is wider in a direction perpendicular to a flow direction through the first Venturi gap than a second portion; and
    an actuator having a piston operatively connected to the valve mechanism for movement therewith to control a flow of the boost pressure through the through passage in the gate member; wherein the ejector comprises:
        a second conduit defining a second passageway that includes a second Venturi gap separating the second passageway into a second converging section and a second diverging section that both narrow toward the second Venturi gap; and
        an upper body portion defining a first suction port in fluid communication with the second Venturi gap, wherein suction is created by a draw of fluid from the first suction port into the second Venturi gap.

2. The ejector assembly of claim 1, wherein the pressure regulator further comprises an internal chamber housing a spring and having a port in fluid communication with a source at a pressure less than the boost pressure.

3. The ejector assembly of claim 1, wherein the valve opening into the first diverging section is a rectangularly-shaped opening with longer sides thereof oriented perpendicular to the flow direction through the first Venturi gap.

4. The ejector assembly of claim 3, wherein the second portion of the passage through the valve mechanism is smaller than the valve opening, thereby closing a portion of the valve opening when aligned therewith.

5. The ejector assembly of claim 4, wherein the passage of the valve mechanism further comprises an intermediate portion between the first portion and the second portion, the intermediate portion continuously tapering from the first portion to the second portion.

6. The ejector assembly of claim 1, further comprising a noise attenuating unit attenuating noise downstream of the second Venturi gap of the ejector.

7. The ejector assembly of claim 6, wherein the noise attenuating unit houses a porous sound attenuating member through which the regulated boost pressure flows.

8. The ejector assembly of claim 1, wherein the first suction port is in fluid communication with a device requiring vacuum.

9. The ejector assembly of claim 3, wherein the pressure regulator includes a spring biasing the piston and the piston has a piston face opposite the spring that receives boost pressure to overcome the normal force applied by the spring to selectively allow the boost pressure to pass through the valve opening in the valve mechanism under selected conditions and into the ejector as regulated boost pressure.

10. The ejector assembly of claim 9, wherein the first converging section defines an opening into the actuator placing boost pressure in fluid communication with the piston face that is opposite the spring.

11. The ejector assembly of claim 1, further comprising an aspirator in fluid communication between the first suction port of the ejector and a device requiring vacuum.

12. The ejector assembly of claim 11, wherein the aspirator comprises a third conduit defining a third passageway that includes a third Venturi gap separating the third passageway into a third converging section and a third diverging section that both narrow toward the third Venturi gap, and defining a second suction portion in fluid communication with the third Venturi gap and the device requiring vacuum.

13. An engine system comprising:
    a turbocharger having a compressor;
    an ejector system of claim 1 in fluid communication with the compressor, wherein the boost pressure is from the compressor and is in fluid communication with the first converging section of the pressure regulator; and
    a device requiring vacuum in fluid communication with the ejector.

14. The engine system of claim 13, wherein the pressure regulator defines an internal chamber housing a spring and having a port in fluid communication with a source at a pressure less than the boost pressure and comprises a piston operatively connected to the valve mechanism for movement therewith to control the passage of boost pressure through the valve opening.

15. The engine system of claim 13, wherein the valve mechanism comprises a passage therethrough that includes a narrowing portion that is narrower than the valve opening.

* * * * *

UNITED STATES PATENT AND TRADEMARK OFFICE
CERTIFICATE OF CORRECTION

PATENT NO. : 10,024,339 B2
APPLICATION NO. : 14/725642
DATED : July 17, 2018
INVENTOR(S) : David E. Fletcher et al.

Page 1 of 1

It is certified that error appears in the above-identified patent and that said Letters Patent is hereby corrected as shown below:

In the Claims

Column 10, Claim 9, Line 1, should read:
-- The ejector assembly of claim 1, --

Signed and Sealed this
Eleventh Day of December, 2018

Andrei Iancu
*Director of the United States Patent and Trademark Office*